US011142332B2

United States Patent
Compton et al.

(10) Patent No.: US 11,142,332 B2
(45) Date of Patent: Oct. 12, 2021

(54) POWER SUPPLY AND METHOD HAVING SERIES-ARRANGED UNITS

(71) Applicant: GE Aviation Systems Limited, Cheltenham (GB)

(72) Inventors: Russell Mark Compton, Droitwich Spa (GB); Colin John Halsey, Tewkesbury (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 16/509,666

(22) Filed: Jul. 12, 2019

(65) Prior Publication Data
US 2020/0017232 A1 Jan. 16, 2020

(30) Foreign Application Priority Data

Jul. 13, 2018 (GB) ...................................... 1811536
Dec. 13, 2018 (GB) ...................................... 1820342

(51) Int. Cl.
*B64D 41/00* (2006.01)
*H02J 3/32* (2006.01)
*H02J 4/00* (2006.01)
*H02J 7/34* (2006.01)
*H02J 7/35* (2006.01)

(52) U.S. Cl.
CPC ................ *B64D 41/00* (2013.01); *H02J 3/32* (2013.01); *H02J 4/00* (2013.01); *H02J 7/34* (2013.01); *B64D 2221/00* (2013.01); *H02J 7/345* (2013.01); *H02J 7/35* (2013.01)

(58) Field of Classification Search
CPC ....... B64D 41/00; B64D 2231/00; H02J 3/00; H02J 7/00; H02J 4/00
See application file for complete search history.

(56) References Cited

U.S. PATENT DOCUMENTS

| 5,729,059 | A |   | 3/1998 | Kilroy et al. |
|---|---|---|---|---|
| 6,034,506 | A | * | 3/2000 | Hall ...................... H02J 7/0019 320/101 |
| 7,847,436 | B2 |   | 12/2010 | Blackmond |
| 8,820,677 | B2 |   | 9/2014 | Rajashekara et al. |

(Continued)

FOREIGN PATENT DOCUMENTS

| CN | 202651832 U | 5/2012 |
|---|---|---|
| DE | 1020132083241 A | 11/2014 |

(Continued)

OTHER PUBLICATIONS

European Patent Office, Extended Search Report re Application No. 19186122.8-1202, dated Nov. 22, 2019, 10 pages, Munich, Germany.

(Continued)

*Primary Examiner* — Hal Kaplan
*Assistant Examiner* — Joseph N Inge
(74) *Attorney, Agent, or Firm* — McGarry Bair PC

(57) ABSTRACT

A method and apparatus for a power distribution system, includes providing, from a power source having a set of dischargeable power storage devices connected by way of selectable connections, a power supply to a voltage output, and switchably connecting the voltage output to a set of power outputs having different electrical characteristics.

20 Claims, 10 Drawing Sheets

FIG. 3

(56) References Cited

U.S. PATENT DOCUMENTS

| | | | |
|---|---|---|---|
| 8,928,179 B2 | 1/2015 | Said | |
| 9,643,729 B2 * | 5/2017 | Walter-Robinson | B64D 41/00 |
| 9,725,169 B2 * | 8/2017 | Lemus Martin | B64D 31/14 |
| 9,800,050 B2 * | 10/2017 | Clifton | H02J 3/38 |
| 9,923,371 B1 * | 3/2018 | Emert | H02J 3/06 |
| 9,966,764 B2 | 5/2018 | Buffenbarger et al. | |
| 10,804,809 B1 * | 10/2020 | Yelaverthi | H02M 3/33561 |
| 2006/0044857 A1 | 3/2006 | Lemak | |
| 2008/0084118 A1 | 4/2008 | Lando et al. | |
| 2010/0276996 A1 | 11/2010 | Karipides | |
| 2011/0254373 A1 * | 10/2011 | Johnson | H02M 7/483 307/77 |
| 2011/2543731 | 10/2011 | Johnson | |
| 2012/0013177 A1 * | 1/2012 | Krenz | H02J 4/00 307/9.1 |
| 2012/0318914 A1 * | 12/2012 | Rajashekara | B64D 41/00 244/58 |
| 2015/0035358 A1 * | 2/2015 | Linkhart | H02J 3/0073 307/23 |
| 2016/0172862 A1 * | 6/2016 | Nishigai | H02J 7/34 307/25 |
| 2016/0218656 A1 * | 7/2016 | Hawliczek | H01M 16/006 |
| 2016/0352129 A1 | 12/2016 | Casimir et al. | |
| 2018/0233923 A1 * | 8/2018 | Compton | H02J 4/00 |
| 2018/0254651 A1 | 9/2018 | Hallmark et al. | |
| 2019/0019637 A1 * | 1/2019 | Compton | H01H 9/542 |
| 2019/0273380 A1 * | 9/2019 | Collins | H02J 7/0063 |
| 2020/0144830 A1 * | 5/2020 | Muenzel | H02J 7/0024 |

FOREIGN PATENT DOCUMENTS

| | | |
|---|---|---|
| EP | 2541723 A1 | 1/2013 |
| EP | 2582009 A1 | 4/2013 |
| EP | 2727838 A2 | 5/2014 |
| EP | 2899869 A1 | 7/2015 |
| GB | 2547706 A | 8/2017 |
| WO | 9941828 A1 | 8/1999 |
| WO | 2010083291 A1 | 7/2010 |
| WO | 2012033958 A1 | 3/2012 |
| WO | 2012068734 A1 | 5/2012 |
| WO | 2015157600 A1 | 10/2015 |
| WO | 2017182091 A1 | 10/2017 |
| WO | 2017223267 A1 | 12/2017 |

OTHER PUBLICATIONS

Intellectual Property Office, Combined Search and Examination Report under Sections 17 & 18(3) re Corresponding Application No. GB1820342.2, dated May 15, 2019, 7 pages, South Wales, NP.

* cited by examiner

POWER SUPPLY AND METHOD HAVING SERIES-ARRANGED UNITS

CROSS-REFERENCE TO RELATED APPLICATIONS

This application claims the benefit of United Kingdom Patent Application No. 1811536.0, filed Jul. 13, 2018, and United Kingdom Patent Application No. 1820342.2, filed Dec. 13, 2018, which are incorporated herein by reference in their entirety.

BACKGROUND

Electrical power distribution systems manage the allocation of power from energy sources to electrical loads that consume the distributed electrical power. In an aircraft, one or more turbine engines provide for propulsion of the aircraft, and can further provide mechanical energy to generate electricity that is supplied to a number of selectively interconnected power buses. The power buses can be selectively connected by way of contactors, and ultimately power a number of different accessories such as environmental control systems (ECS), in-flight entertainment systems, windshield deicing, galleys, fuel pumps, and hydraulic pumps, e.g., equipment for functions needed on an aircraft other than propulsion. For example, contemporary aircraft utilize electrical power for electrical loads related to avionics, motors, and other electric equipment.

BRIEF DESCRIPTION

In one aspect, the present disclosure relates to a power supply, including a set of power storage units arranged in series, each power storage unit having a respective direct current (DC) dischargeable power storage device, a first selectable connection configured to enable a voltage output of the respective power storage device, and a second selectable connection configured to enable bypassing the voltage output of the respective power storage device, a controller module communicatively connected with the set of first selectable connections and the set of second selectable connections and configured to selectively enable at least a subset of the first selectable connections or a subset of the second selectable connections, and a voltage output for the set of power storage units configured to be switchably connected with a set of power outputs, wherein the set of power outputs have different electrical characteristics.

In another aspect, the present disclosure relates to a method of supplying power, the method including selectively enabling, by a controller module, one of a voltage output connection or a bypass connection for each of a set of dischargeable direct current (DC) power storage units arranged in series such that the summated output of the set of power storage units is provided to a set of switchably connectable power outputs.

DETAILED DESCRIPTION

Figure 1:
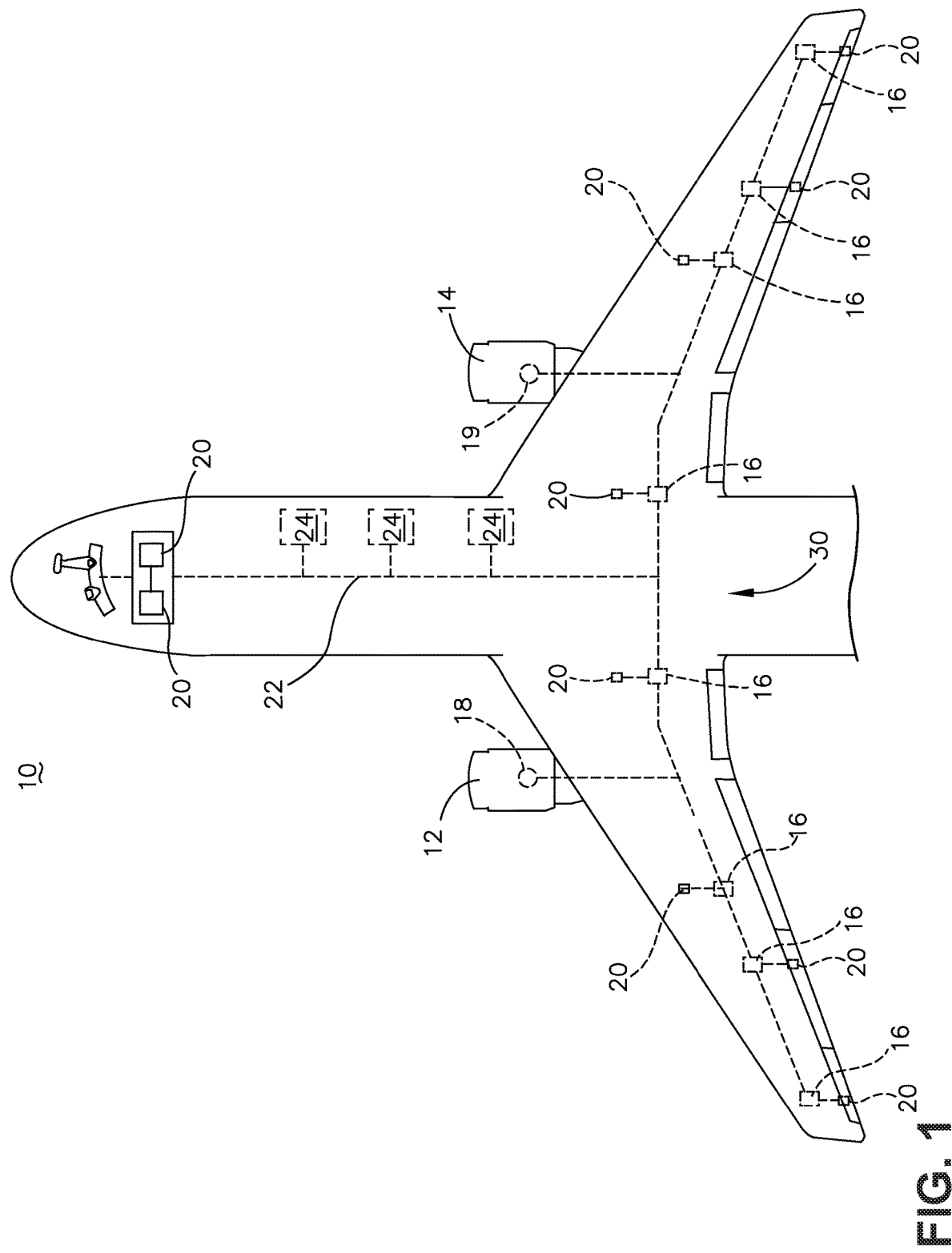
FIG. 1 is a top down schematic view of an aircraft and power distribution system of an aircraft, in accordance with various aspects described herein.

Aspects of the present disclosure are described herein in the context of an aircraft, which enables production of electrical power from an energy source such as a turbine engine, jet fuel, hydrogen, etc. However, it will be understood that the disclosure is not so limited and has general applicability to power distribution systems in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The exemplary drawings are for purposes of illustration only and the dimensions, positions, order and relative sizes reflected in the drawings attached hereto can vary.

Referring now to FIG. 1, an aircraft 10 is shown having at least one turbine engine, shown as a left engine system 12 and a right engine system 14. Alternatively, the power system can have fewer or additional engine systems. The left and right engine systems 12, 14 can be substantially identical, and can further include at least one power source, illustrated respectively as a first generator 18 and a second generator 19. At least one of the first or second generators 18, 19 can include variable speed or variable output generators 18, 19. In this example, a variable speed or variable output generator 18, 19 can include a generator 18, 19 adapted or configured to operate within a predetermined range of input speed, gearbox speed ratios, or the like, and can generate a power output within a predetermined output range (e.g. voltage output range, current output range, frequency output range, or a combination thereof). In one non-limiting example, a variable output generator 18, 19 can include a generator adapted or configured to output approximately 115 Volts AC between 390 and 410 Hertz.

The left and right engine systems 12, 14 can further include another respective power source, such as a second electric machine or set of generators (not shown). Non-limiting aspects of the disclosure can be included wherein, for example, the left engine system 12 includes the first generator 18 as a primary power source and an additional generator as a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18, 19 via a power distribution system 30 including, for instance, power transmission lines 22, bus bars, power buses (or the like), and a set of power distribution nodes 16. The aircraft 10 can further include a set of supplemental power sources 24 selectably connectable with the transmission lines 22, and operable to provide at least a portion of primary power, supplemental power, redundant power, backup power, emergency power, or the like. Non-limiting examples of the supplemental power sources 24 can include, but are not limited to, generators, such as auxiliary or emergency power generators, solar panels, fuel cells, batteries, or any other source of electrical power. As shown, the set of supplemental power sources 24 can provide power to the set of transmission lines 22, and thus, the set of power distribution nodes 16 or the set of electrical loads 20.

In the aircraft 10, the operating left and right engine systems 12, 14 provide mechanical energy which can be extracted, typically via a spool, to provide a driving force for the set of generators 18, 19. The set of generators 18, 19, in turn, generate power, such as AC or DC power, and provides the generated power to the transmission lines 22, which delivers the power to the electrical loads 20, positioned throughout the aircraft 10. Furthermore, during operation, the set of supplemental power sources 24 can be selectably connected with the transmission lines 22, and operable to provide primary or supplemental power to a subset of the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power sources 24 can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
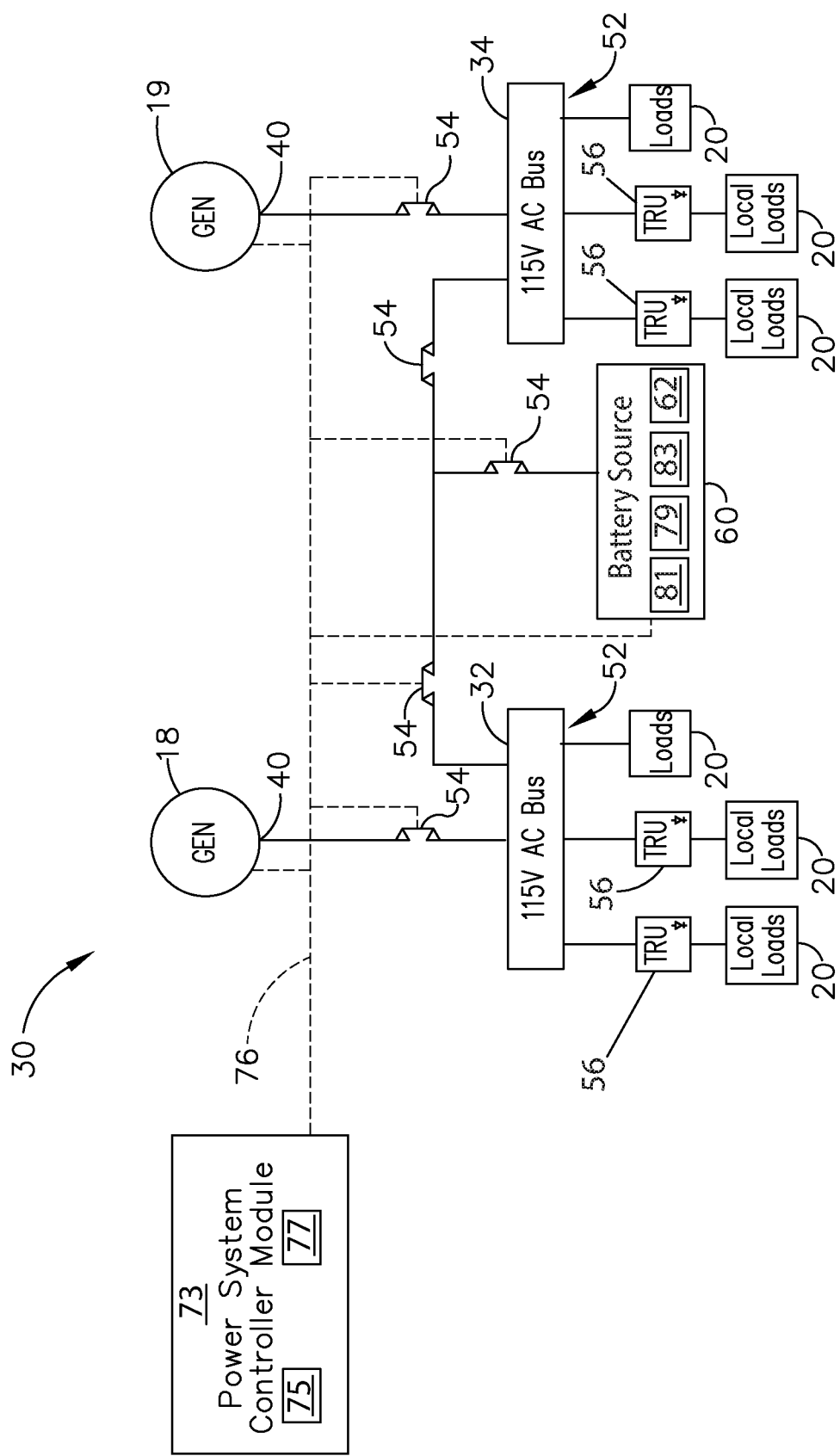
FIG. 2 is a schematic illustration of the power distribution system of the aircraft of FIG. 1, in accordance with various aspects described herein.

Referring now to FIG. 2, a schematic illustration is shown of an exemplary power distribution system 30 that can be utilized in the aircraft 10. The power distribution system 30 is shown having a set of power sources, such as of the first generator 18 and the second generator 19. While two generators 18, 19 are shown, aspects of the disclosure can include any number of generators 18, 19 or power sources, as desired. In addition, the set of generators 18, 19 can include a respective power output 40 for supplying power to various system components. While the set of generators 18, 19 are illustrated similarly, it is contemplated that the set of generators 18, 19 can supply or generate substantially similar electrical power output characteristics or varying electrical power output characteristics.

Each generator 18, 19 can be selectively connected via the power outputs 40 to a respective power bus of the power distribution system 30, shown as a first power bus 32 connectable with the first generator 18 and a second power bus 34 connectable with the second generator. A contactor 54 can be utilized between each generator 18, 19 and its respective power bus 32, 34 as a relay or switch to selectively connect the generator 18, 19 to the power bus 32, 34. As used herein, a contactor 54 can include a selectively controllable device adapted or configured to enable switching, connecting, or disconnecting between respective components. The set of power buses 32, 34 can further be connected with a corresponding set of electrical loads 20. In one non-limiting example, a subset of electrical loads 20 can be connected with a respective power bus 32, 34 by way of at least one transformer rectifier unit (TRU) 56. As used herein, a TRU 56 can be configured or adapted to convert or rectify the electrical power characteristics of the supplied power from the power bus 32, 34 to another, a different, an alternative, or an appropriate electrical power characteristic for a given electrical load 20. Addition, multiple power buses 32, 34 can be selectively connected or coupled together by way of contactors 54, for instance, to tie one power bus 32 with at least another power bus 34. In this instance, a power source or supply, such as the first generator 18, can selectively or operably supply power to the first power bus 32, which can be further shared, supplied, or supplemented with the second power bus 34, by way of the contactor 54.

The power distribution system 30 can also include at least one additional battery power source 60 that can be selectively connected to at least one power bus 32, 34, such as by way of a contactor 54. The battery power source 60 can include controller module 79 including a processor 81 and memory 83, as well as a set of power storage units 62. Each power storage unit 62, or the set of power storage units 62 can include at least one DC power storage device, and associated circuitry, such as switching modules, to enable an AC voltage output or a DC power output of the DC power storage device. Non-limiting examples of the power storage unit 62 or power storage devices can include a dischargeable DC power storage device, such as a battery, a battery bank, a battery cell, a super capacitor, a fuel cell, a hydrogen cell, or a continuously or semi-continuous power conversion or supplying device, such as a solar cell, a wind turbine, or the like. The power storage unit 62 or the power storage device can also include a dischargeable or rechargeable power storage device.

In combination with the processor 81 and memory 83, aspects of the battery power source 60 can be adapted or configured to operably control the enabling of the set of power storage units 62 to provide a controllable power output of the battery power source 60. In another non-limiting example, the battery power source 60 can include one or more power sensors configured to sense a dischargeable power output of the battery power source 60, for example, to ensure a desired power output is being supplied.

The battery power source 60 can be configured or adapted to provide a controllable supply of electrical power to the respective power bus 32, 34, including, but not limited to, a controllable supply of AC electrical power. As described, the battery power source 60 can provide a "controllable" supply of electrical power, such that specific output characteristics of the power supply, including but not limited to voltage output range, current output range, frequency output range, phase, or a combination thereof, can be controlled, modified, adapted, or the like, to supply a predetermined, sensed, predicted, or target supply of electrical power. In this sense, the controllable supply of electrical power from the battery power source 60 can be dynamically altered, adjusted, changed, or modified, even as it is being supplied to the respective power bus 32, 34. Aspects of the disclosure can be included, however, wherein the total available, peak, or continuous power supply, wattage, or the like, of the power source 60 can be different from the other power sources.

The power distribution system 30 can further include a power system controller module 73 having a processor 75 and memory 77. In this sense, the power system controller module 73 can be communicatively connected (for example, by way of communication lines 76) with each respective contactor 54, battery power source 60, generator 18, 19, or the like. In response to control signals or instruction signals generated by the power system controller module 73, the contactors 54 can selectively enable or disable electrical connections between respective components. Also in response to control signals or instruction signals generated by the power system controller module 73, the battery power sources 60 can selectively supply a predetermined or controllable AC power supply, such as by selective discharging of the set of power storage units 62, to a respective power bus 32, 34.

Figure 3:
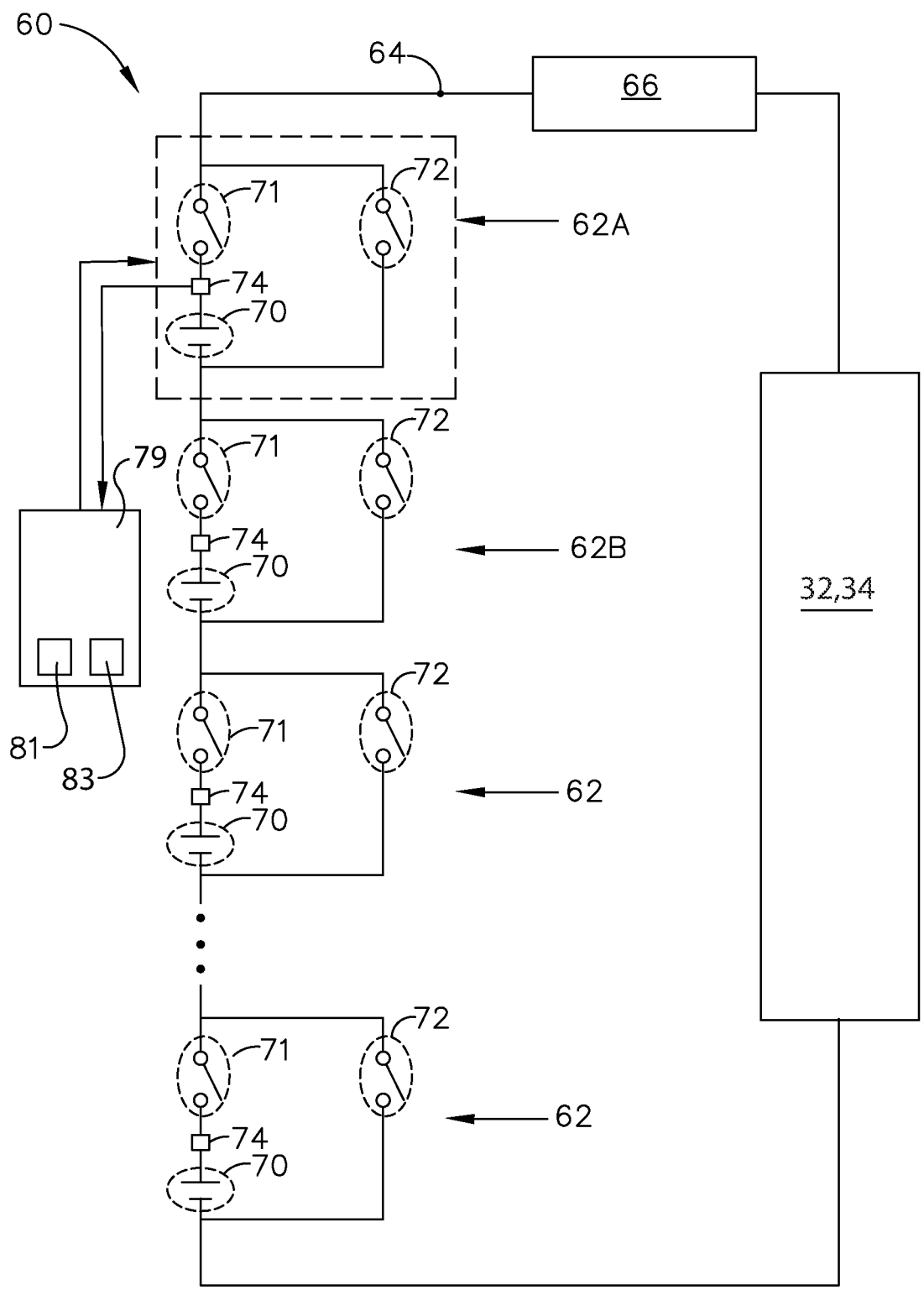
FIG. 3 is a schematic illustration of a battery power source that can be utilized in the power distribution system of FIG. 1, in accordance with various aspects described herein.

Turning to FIG. 3, the battery power source 60 is illustrated where a set of power storage units 62 are arranged in series to define a power output 64 connected with the power bus 32, 34. A power filtering element 66 can also be included in the battery power source 60 at the power output 64. In one non-limiting example, the power filtering element 66 can be configured to smooth sudden increases or decreases in power or voltage output as desired. In another non-limiting example, the power filtering element 66 can be configured to smooth the switching noise or a periodic waveform, such as an AC waveform.

Each power storage unit 62 can include at least one DC power storage device 70, a first selectable connection 71 (e.g. a switch) configured or adapted to enable a voltage output of the DC power storage device 70, and a second selectable connection 72 configured or adapted to enable bypassing the voltage output of the DC power storage device 70. Non-limiting examples of the power storage device 70 can include a dischargeable DC power storage device, such as a battery, a battery bank, a battery cell, a super capacitor, a fuel cell, a hydrogen cell, or a continuously or semi-continuous power conversion or supplying device, such as a solar cell, wind turbine, or the like. In another non-limiting example, the power storage device 70 can include a dischargeable or rechargeable power storage device. In one example where the first connection 71 is in an open state and the second connection 72 is in a closed state, the DC power storage device 70 can be bypassed, e.g. not utilizing power stored in the DC power storage device 70 at the power output 64. In another example where the first connection 71 is in a closed state and the second connection 72 is in an open state, the DC power storage device 70 can contribute its supply of power at the power output 64. Furthermore, each power storage unit 62 can also include a power sensor 74 configured to sense a dischargeable power output of the DC power storage device 70.

The battery power source 60 can further include a controller module 79 having a processor 81 and memory 83. The controller module 79 can be communicatively connected with the first selectable connections 71 and second selectable connection 72, as well as the power sensor 74, for each power storage unit 62. While a "power" sensor 74 is described, non-limiting aspects of the power sensor can be adapted or configured to sense or measure power, power-related values, or other value that can affect operation of the power storage unit 62, including but not limited to, voltage of the DC power storage device 70, the temperature of the DC power storage device 70 or the power storage unit 62, or the like. FIG. 3 illustrates the controller module 79 connected with only one power storage unit (e.g. a first power storage unit 62A) for brevity and ease of understanding. It is also contemplated that the controller module 79 can be communicatively connected with each of the first and second selectable connections 71, 72 of each power storage unit 62 within the battery power source 60. The controller module 79 can thereby be configured to selectively enable at least a subset of the first selectable connections 71 or a subset of the second selectable connections 72 as desired. Non-limiting aspects of the disclosure can be included wherein one of the first or the second selectable connections 71, 72 is in a closed state at a time. The controller module 79 can further include an AC waveform profile 86, such as by storing in memory 83.

The controller module 79 can be configured to selectively enable a preselected number of first or second selectable connections 71, 72. It can be appreciated that the series connection between the power storage units 70 can provide for an increase or decrease of maximum suppliable voltage at the power output 64. In one non-limiting example, the controller module 79 can controllably enable a first selectable connection 71 of each of a first and second power storage unit 62A, 62B, and also disable a second selectable connection 72 of each of the first and second power storage units 62A, 62B. Correspondingly, the controller module 79 can controllably enable the second selectable connection 72 for each remaining power storage unit 62. In this manner, the first and second power storage units 62A, 62B together can provide their summated power to the power output 64 by their series connection, while the remaining power storage unit 62 voltage outputs are bypassed. It should be understood that the battery power source 60 can include any number of power storage units 62, of which any subset or all units 62 can be controlled by the controller module 79.

Figure 4:
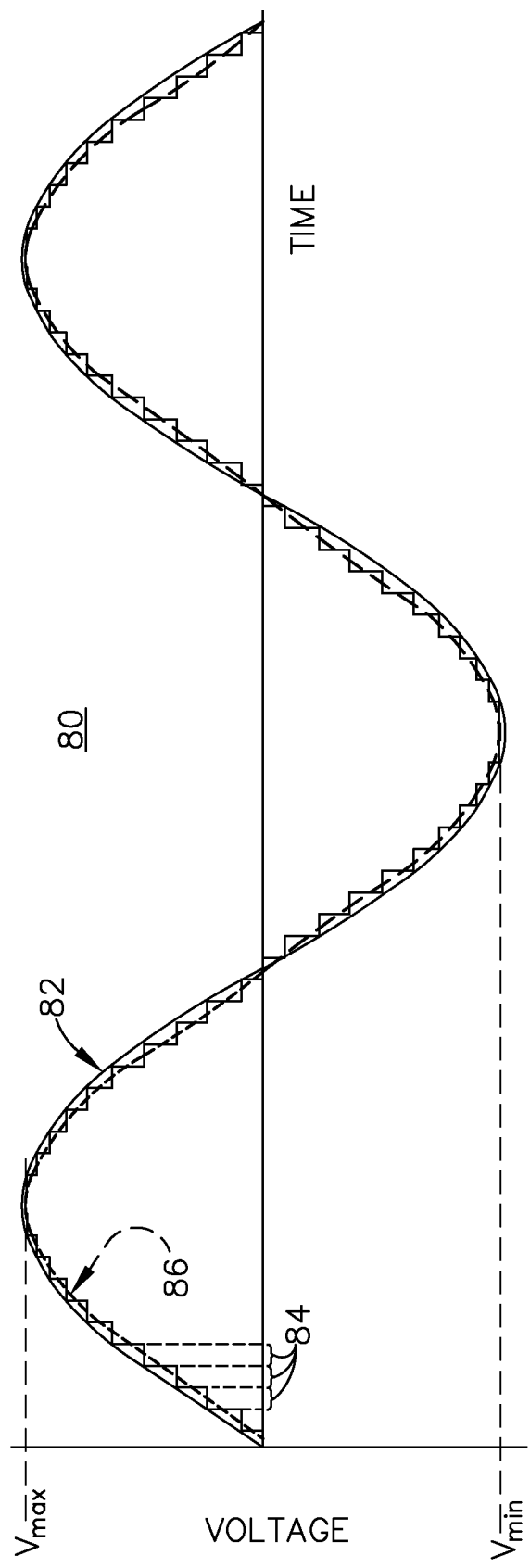
FIG. 4 is a schematic illustration of a voltage plot of an AC waveform of the battery power source of FIG. 3, in accordance with various aspects described herein.

FIG. 4 demonstrates one non-limiting example voltage plot 80 illustrating an ideal, desired, or target AC waveform output profile 82 for the battery power source 60. As shown, a controllably or sequenced enabling and disabling of power storage units 62 of the battery power source 60 (shown by stepped voltage outputs 84) can collectively represent a total AC battery power source output 86 over a positive and negative voltage waveform. In one example, a power filtering element can produce, average, or "smooth" out the AC battery power source output 86. In this sense, the controllable AC battery power source output 86 can emulate the AC waveform output profile 82. The controllable AC battery power source output 86 can further be controllably generated by way of the processor 81 of the battery power source 60 or in response to control signals or instruction signals from the power system controller module 73 to vary or modify the frequency, phase, timing, voltage output, or the like of the battery power source output 86, as needed. In one non-limiting example, the controllable AC battery power source output 86 can be controlled or controllable to match, correspond to, or align with an existing AC power supply, such as the first or second generator 18, 19, or another power supply of the power bus 32, 34.

While aspects of the FIG. 4 demonstrate the battery power source 60 can be selectably operated to generate or otherwise supply an AC battery power source output 86, non-limiting aspects of the disclosure can further be included wherein the controllable switching of the set of a first selectable connections 71 and set of second selectable connections 72 allow for or enable a DC battery power source output, wherein the summated series of DC power outputs of at least a subset of the power storage units 62 are supplied to the power output 64 of FIG. 3.

Figure 5:
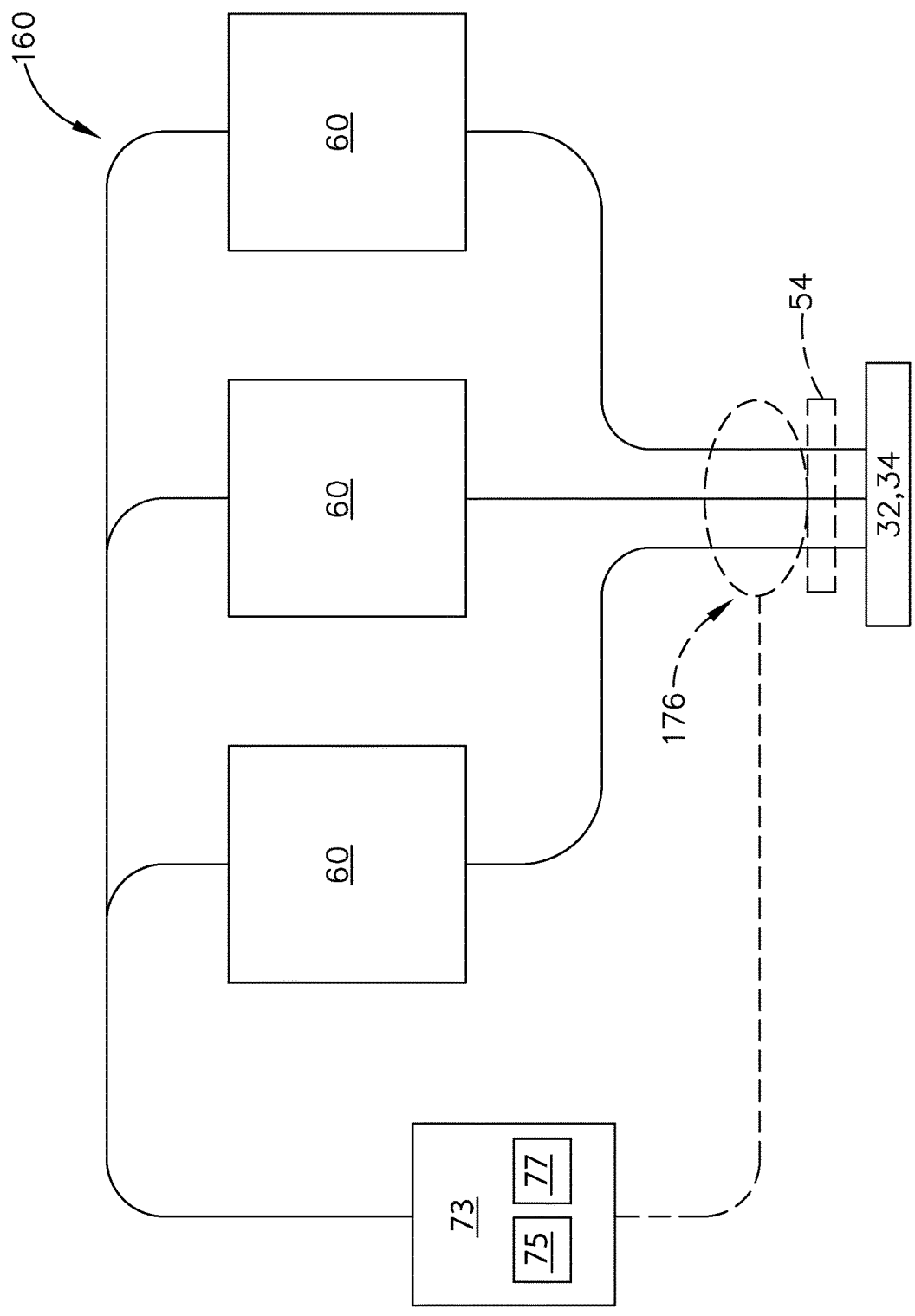
FIG. 5 illustrates a three-phase AC power source that can be utilized in the power distribution system of FIG. 2, in accordance with various aspects described herein.

FIG. 5 illustrates another AC battery power source system 160 that can be utilized in the power distribution system 30 of FIGS. 1 and 2. As shown, the AC battery power source system 160 can include a set of battery power sources 60 controllably and communicatively connected with the power system controller module 73, and having a set of outputs connected with the AC power bus 32, 34 by way of a contactor 54. In this sense, a set of single phase AC battery power source outputs 86 (as shown in FIG. 4) can be combined to provide a multi-phase AC battery power source system 160 output to the AC power bus 32, 34. In the illustrated example, three single phase AC battery power sources 60 can be controllably operated to supply a three-phase AC battery power source to the power bus 32, 34. While a three-phase AC battery power source system 160 is shown and described it will be understood that aspects of the disclosure can be included to grouped a set of AC battery power sources 60 into any number of phase-outputs, including, but not limited to, two-phase, four-phase, six-phase outputs, or the like.

In another non-limiting example of the disclosure, the battery power source system 160 is shown including a power sensor 176 adapted or configured to sense the power output of at least one of the battery power sources 60, as explained herein.

Aspects of the disclosure can provide for or enable a power distribution system 30 adapted to transfer power between selectively connected power buses 32, 34 or selectively connected power sources (e.g. the first and second generators 18, 19), by utilizing one or more battery power sources 60 or battery power source systems 160, as described herein.

During power generating operations, multiple power sources, such as multiple generators 18, 19, secondary generators, auxiliary power units (APUs), or the like, provide redundancy or alternative power sources that can supply power to one or more of the power buses 32, 34. In some instances, the multiple power sources are not synchronized in either phase or frequency. Thus, to provide power transfer between different power sources, the frequencies and phases (and sometimes the voltages) of the transferring power sources can be matched so the power sources can be temporarily connected in parallel with the power bus 32, 34 (e.g. "seamless" or "no-break" power transfer, where power is not interrupted to the power bus 32, 34). In this example, the different power sources can align or harmonize prior to energizing the power bus 32, 34. Alternatively, to provide power transfer between different power sources, the first power source can be disconnected from the power bus 32, 34 prior to the second power source being connected with the power bus 32, 34 (e.g. having a "break" power transfer where a continuous power supply is "broken"). In the example of the break power transfer, no harmonization between power sources is needed.

Referring back to FIG. 4, aspects of the disclosure can provide for or enable a "no-break" power transfer power distribution system 30 for a power bus 32, 34, such as the first power bus 32, from a first power source such as the first generator 18 to a second power source such as the second generator 19. The "no-break" power transfer can include utilizing at least one battery power source 60 to supply power to the first power bus 32 during a period of time where the first generator 18 is disconnected and before the second generator 19 is connected, and wherein the controllable power supply of the at least one battery power source 60 can be controllably modified or altered, while supplying the power, to vary between the power output characteristics (e.g. voltage output, current output, frequency output, phase, etc.) of the first generator 18 to the power output characteristics of the second generator 19. In this sense, the at least one battery power source 60 can "bridge" the power transfer between the first generator 18 and the second generator 19, wherein the first and second generators 18, 19 do not need to be harmonized, as described.

Figure 6:
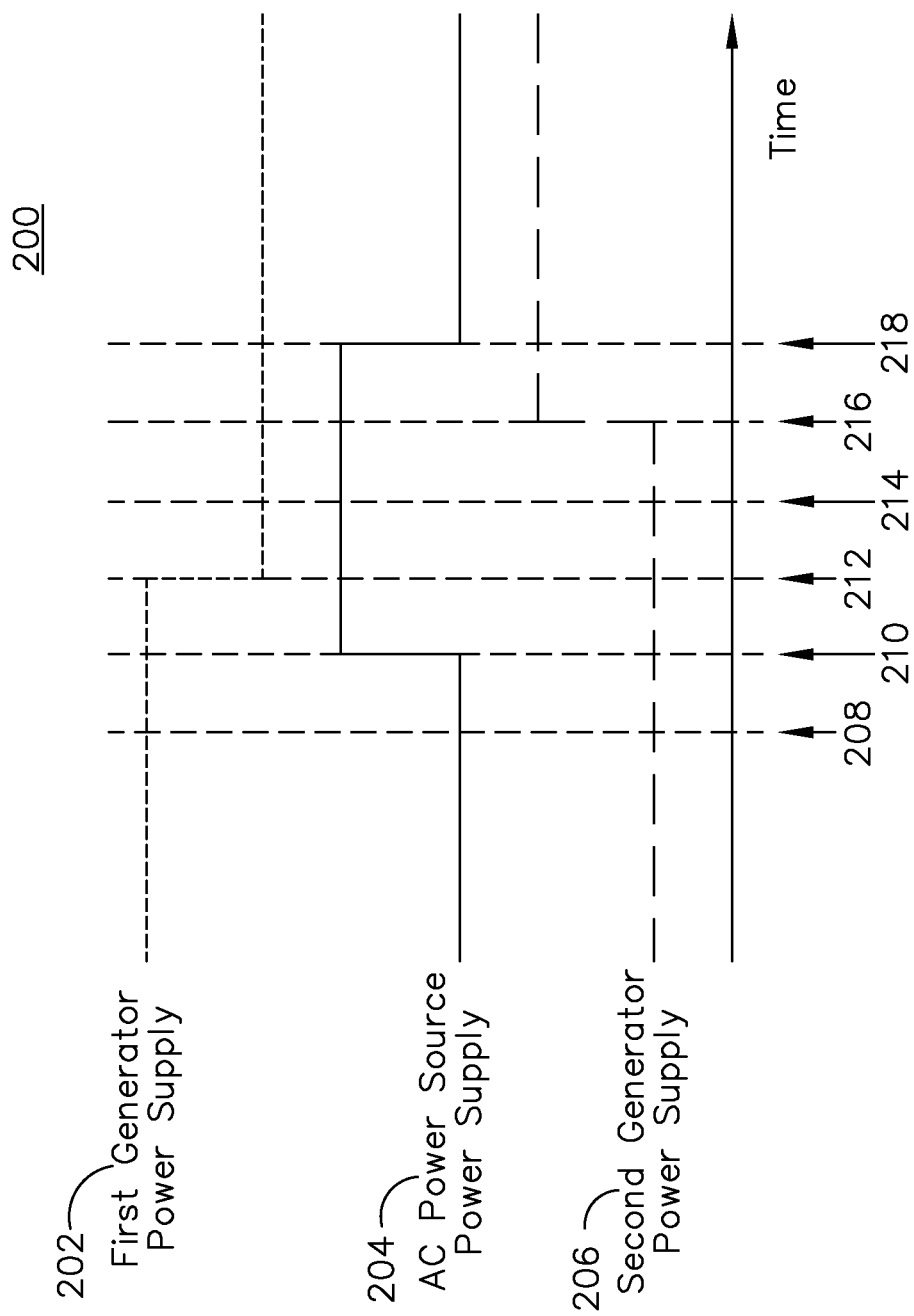
FIG. 6 is an example graph illustrating the supplying of power during a power transfer event of the power distribution system, in accordance with various aspects described herein.

FIG. 6 illustrates an example graph 200 illustrating the no-break power transfer of the power distribution system 30 over a period of time. The example graph 200 illustrates a representative binary indication of which power supplies are supplying power to, for example, the first power bus 32, over the period of no-break power transfer. As shown, a first signal 202 represents the supplying of power by the first generator 18, a second signal 204 represents the supplying of power by the battery power source 60, 160, and a third signal 206 represents the supplying of power by the second generator 29.

At a first time 208, prior to or at the initiation of the no-break power transfer operations, only the first generator 18 is supplying or providing power (e.g. the first signal 202 is "on") to the first power bus 32 at a set of first power output characteristics. At the first time 208, the second signal 204 represents that the battery power source 60, 160 is not supplying power, and the third signal 206 represents that the second generator 19 is not supplying power (e.g. the second and third signals 204, 206 are "off"). In only non-limiting example, the first time 208 can indicate the moment in time when the power system controller module 73 indicates a request to transfer the power supply of the first power bus 32 from the first generator 18 to the second generator 19.

A second time 210 indicates that the battery power source 60, 160 begins supplying or providing power to the first power bus 32 (e.g. second signal 204 turns "on"), such that the first generator 18 and the battery power source 60, 160 are both supplying power, or co-supplying power to the first power bus 32. In one non limiting example, the battery power source 60, 160 can begin supplying power in response to a control or instruction signal received by the battery power source 60 from the power system controller module 73 to enable the generation of the battery power source output 86, as described herein. Additionally, at the second time 210, the power system controller module 73 can selectively instruct the contactor 54 between the battery power source 60, 160 and the first power bus 32 to selectively connect the components. In another non-limiting aspect of the disclosure, during a period of time between the first time 208 and the second time 210, the power system controller module 73 can be sensing, measuring, or otherwise communicating aspects of the first power output characteristics (i.e. power supply characteristics of the first generator 18 output or the first power bus 32), such as the voltage output, current output, frequency output, phase, etc., to the battery power source 60, 160. Thus, when battery power source 60, 160 is enabled, it can supply power in alignment with, harmonized with, or otherwise matching the first power output characteristics.

A third time 212 indicates that the first generator 18 stops supplying power or is disabled from supplying power to the first power bus 32 (e.g. the first signal 202 turns "off"). In one example, this can occur by way of the contactor 54 disconnecting the output 40 of the first generator 18 with the first power bus 32 in response to control or instruction signals provided or generated by the power system controller module 73. Following the third time 212, the battery power source 60, 160 is the only power source or power supply supplying power to the first power bus 32.

A fourth time 214 indicates an arbitrary time between the third time 212 and a fifth time 216, wherein, while the battery power source 60, 160 is solely supplying power to the first power bus 32, the power system controller module 73 can be sensing, measuring, or otherwise communicating aspects of a set of second power output characteristics of the second generator 19 output, such as the voltage output, current output, frequency output, phase, etc., to the battery power source 60, 160. During this time, the second generator 19 output 40 is not being supplied to the first power bus 32, but the battery power source 60, 160 begins to adjust or modify the controllable output being supplied to the first power bus 32 to be in alignment with, harmonized with, or otherwise matching the second power output characteristics. In the period of time between the fourth time 214 and the fifth time 216, the battery power source 60, 160 can controllably adjust of modify at least one of the voltage output, current output, frequency output, phase, or a combination thereof, such that the power supplied to the first power bus 32 by the battery power source 60, 160 between the fourth time 214 and the fifth time 216 is transitioning between a power output synchronized with the first generator 18 to a power output synchronized with the second generator 19. In only non-limiting example, the adjustment or modification of the controllable output of the battery power source 60, 160 can occur over a sequential series of small adjustments or modifications, including but not limited to delays, phase shifts, extending or shorting frequency periods, or the like. In one non-limiting example, controllably transitioning the controllable power supply can include first matching the phase of the second set of electrical characteristics followed by matching the frequency of the second set of electrical characteristics. By the fifth time 216, the battery power source 60, 160 has been synchronized with the second power output characteristics of the second generator 19.

During this period of time (between the fourth time 214 and the fifth time 216), the supplying of the controllable power output characteristics to the first power bus 32 does not cease, is not stopped, and does not interrupt the power demands of the first power bus 32. Stated another way, the power demands of the first power bus 32 or electrical loads 20 therewith are not interrupted, powered down, or operationally jeopardized. Additionally, the battery power source 60, 160 is sized to supply a sufficient amount of electrical power to operate the set of electrical loads 20 connected with the first power bus for at least the period of time to transition the controllable power output characteristics from matching the first power output characteristics to matching the second power output characteristics.

The fifth time 216 indicates that the second generator 19 begins or starts supplying or providing power to the first power bus 32 (e.g. the third signal 206 turns "on"), such that the battery power source 60, 160 and the second generator 19 are both supplying power, or co-supplying power to the first power bus 32. In one example, this can occur by way of the contactors 54 positioned between the first power bus 32 and the second power bus 34 connecting the output 40 of the second generator 19 with the first power bus 32 in response to control or instruction signals provided or generated by the power system controller module 73. Following the fifth time 216, the battery power source 60, 160 and the second generator 19 are supplying power in alignment with, harmonized with, or otherwise matching the second power output characteristics.

Finally, a sixth time 218 indicates that the battery power source 60, 160 stops supplying power to, or is disabled from supplying power to the first power bus 32 (e.g. the second signal 204 turns "off"). In one example, this can occur by way of the contactor 54 disconnecting the battery power source 60, 160 with the first power bus 32 in response to control or instruction signals provided or generated by the power system controller module 73. Following the sixth time 218, the second generator 19 is the only power source or power supply supplying power to the first power bus 32. At this time, the no-break power transfer of the power distribution system 30 has completed.

In one non-limiting example, the total period of time that the battery power source 60, 160 supplies power to the first power bus 32 (e.g. the period of time between the second time 210 and the sixth time 218) can be less than one second.

While aspects of the disclosure describe provide the example of the no-break power transfer for the first power bus 32, non-limiting aspects of the no-break power transfer are applicable for any power bus 32, 34, power distribution system 30, or the like.

Figure 7:
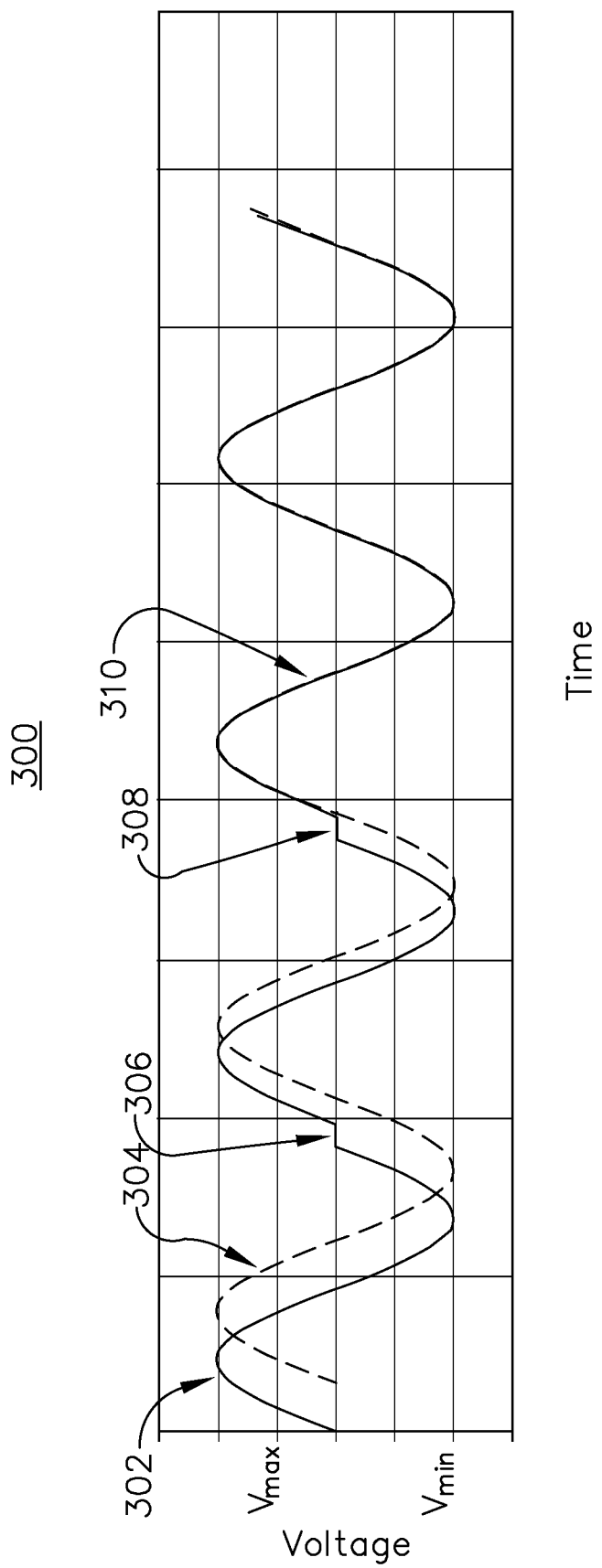
FIG. 7 is a schematic illustration of matching a controllable power output with another power output, in accordance with various aspects described herein.

FIG. 7 further illustrates and example graph 300 illustrating the adjusting or modifying of the controllable output of the battery power source 60, 160 between the fourth time 214 and the fifth time 216 of FIG. 6. The graph 300 illustrates a first AC waveform 302 illustrating the actual controllable output of the battery power source 60, 160 and a second AC waveform 304 of the second power output characteristics sensed or measured of the second generator 19. In one non-limiting example, the second AC waveform 304 can represent the actual sensed or measured second power output characteristics of the second generator 19 (for instance, as sensed by the power system controller module 73), or can represent the predicted or target supply of electrical power expected from the battery power source 60, 160, as described herein.

As shown, a series of small timing delays 306, 308 can be introduced over a number of sequentially successive power or waveform cycles until the first AC waveform 304 matches, harmonizes, or aligns with the second AC waveform 304 (e.g. shown in harmonized wave 310). In one non-limiting aspect of the disclosure, each of the small timing delays 306, 308 can be shorter than a power break or reset power break for the set of electrical loads 20 connected with the first power bus 32. In one non-limiting instance a "power break" or reset power break can include ceasing the supplying of power for longer than a power down or power reset period of time. In this sense, aspects of the disclosure include a "no-break" or "no-power-break" transfer of power.

The sequences depicted is for illustrative purposes only and are not meant to limit the aspects of the disclosure in any way, as it is understood that the portions of the disclosure of application thereof can proceed in a different logical order, additional or intervening portions can be included, or described portions of the method can be divided into multiple portions, or described portions of the method can be omitted without detracting from the described method.

Figure 8:
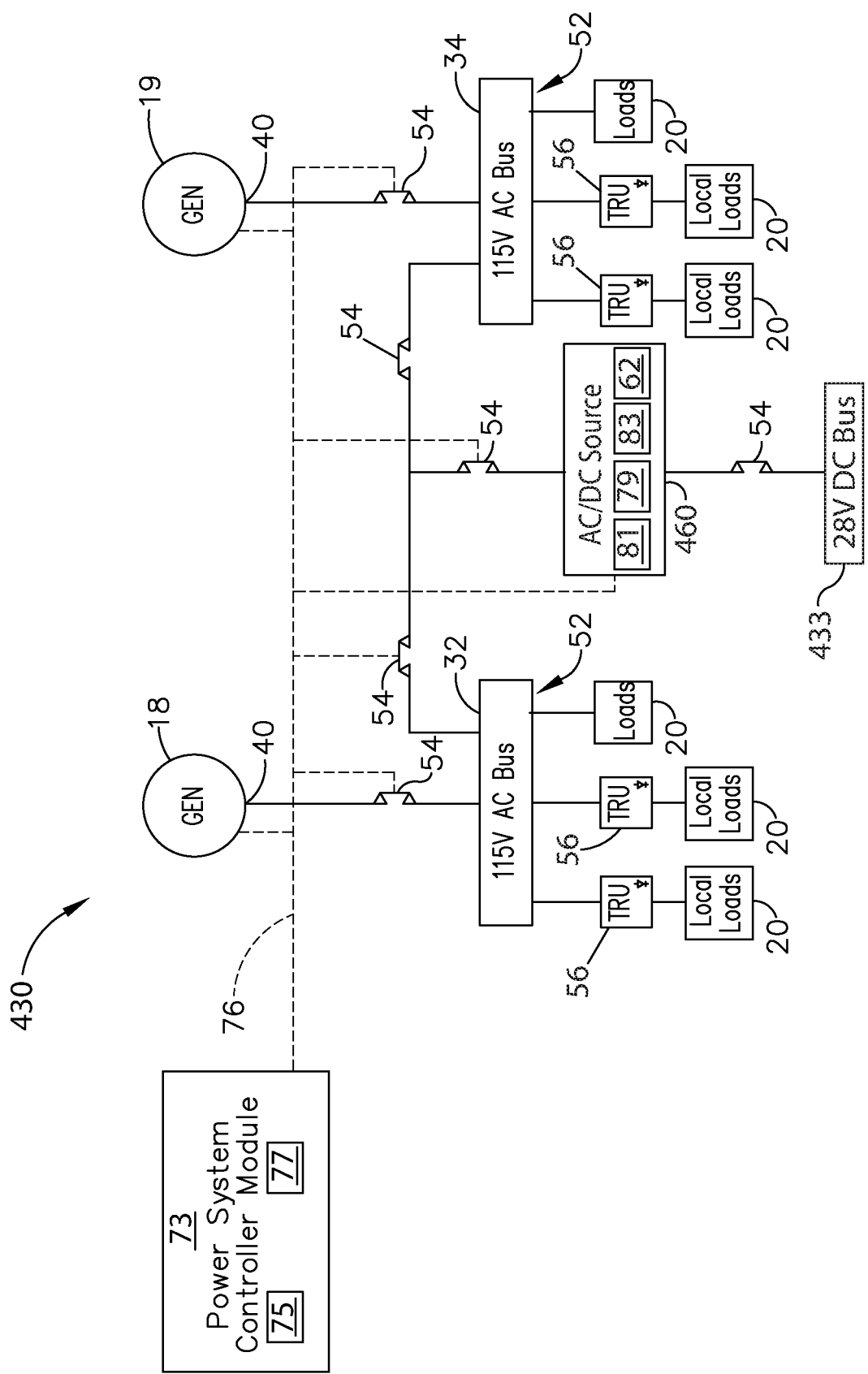
FIG. 8 is a schematic illustration of another power distribution system of the aircraft of FIG. 1, in accordance with various aspects described herein.

FIG. 8 illustrates a power distribution system 430 according to another aspect of the present disclosure. The power distribution system 430 is similar to the power distribution system 30; therefore, like parts will be identified with like numerals increased by 400, with it being understood that the description of the like parts of the power distribution system 30 applies to the power distribution system 430, unless otherwise noted. One difference is that the battery power source is shown as an AC/DC battery power source 460 that can be selectably connected with either an AC power bus 32, 34 or a DC power bus 433. As shown, one non-limiting example of the DC power bus 433 can include a 28 volt DC power bus, but any DC voltage power bus can be included in aspects of the disclosure.

Non-limiting aspects of the power distribution system 430 can be included wherein the AC/DC battery power source 460 can be controllably operated by at least one controller module 73, 79 to either supply an AC power output to an AC power bus 32, 34, perform the no-break power transfer between AC power buses 32, 34, or supply a DC power output to the DC power bus 433.

Figure 9:
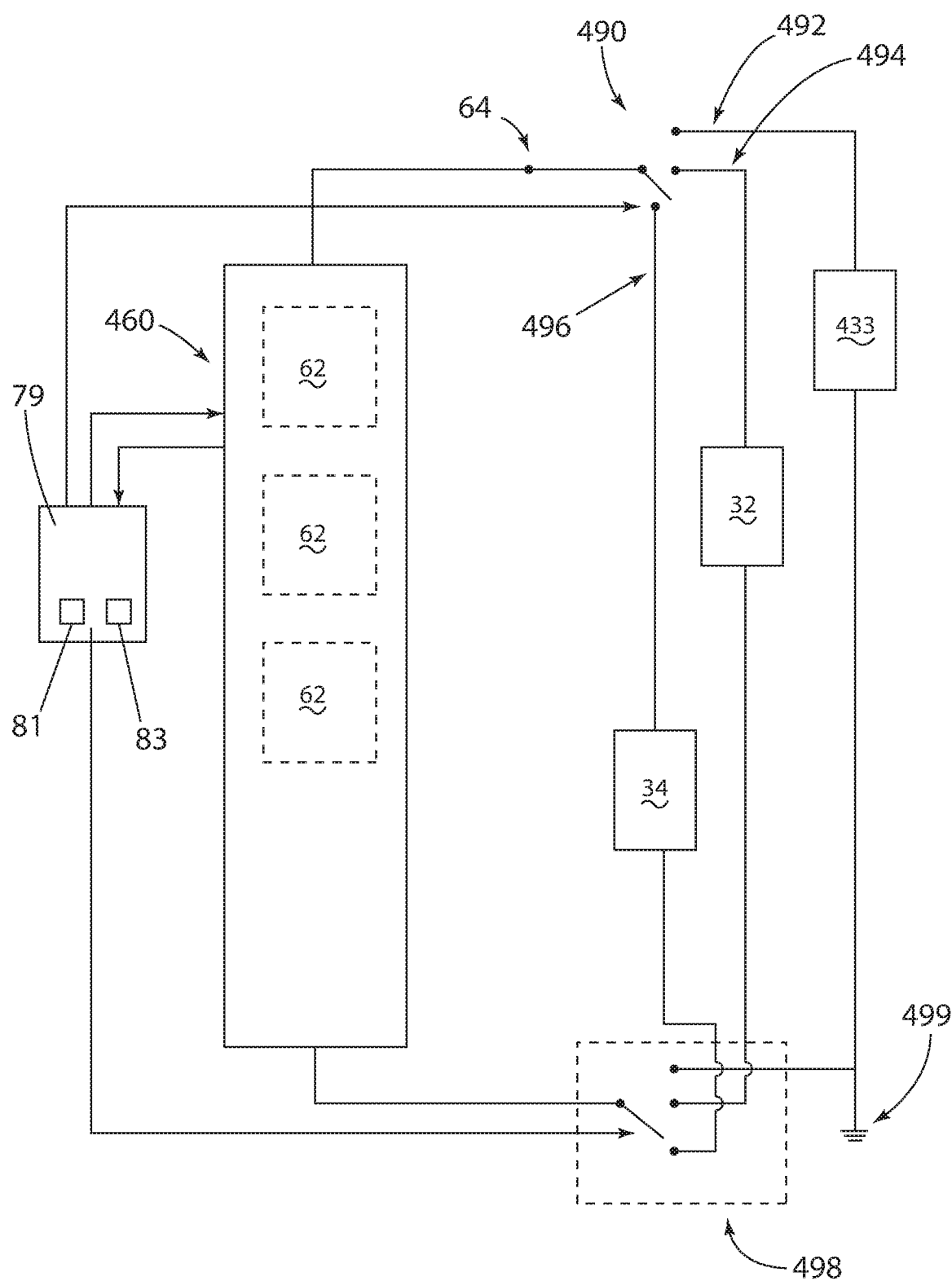
FIG. 9 is a schematic illustration of another battery power source that can be utilized in the power distribution system of FIG. 1, in accordance with various aspects described herein.

FIG. 9 illustrates aspects of the AC/DC battery power source 460 in accordance with aspects of the disclosure. As the AC/DC battery power source 460 can be similar to the battery power source 60, some features are not illustrated for brevity. As shown, the power output 64 of the AC/DC battery power source 460 can include a third switch 490 or a set of third switches adapted or configured to select from a set of power outputs connected with the power buses 32, 34, 433. For example, as shown, the third switch 490 can receive a control signal or command from the controller module 79 to electrically connect the power output 64 with a power input 492 of the DC power bus 433, a power input 494 of the first AC power bus 32, or a power input 496 of the second AC power bus 34.

When the power output 64 of the AC/DC battery power source 460 is connected with the power input 492 of the DC power bus 433, the battery power source 460 can be selectably operated by way of the controller module 79 to provide a DC power output 64, such as 28 volts DC. When the power output 64 of the AC/DC battery power source 460 is connected with either the power input 494 of the first AC power bus 32 or the power input 496 of the second AC power bus 34, the battery power source can be operated by way of the controller module 79 to provide an AC power output 64, or a no-break power transfer power output 64, as described herein.

In yet another non-limiting example, the AC/DC battery power source 460 can include an optional second pole 498 for the third switch, whereby the second pole 498 can operate to mirror the operation of the third switch 490. In this sense, each switchable output of the third switch 490 can include a matching or corresponding switchable connection to a power return conductor for the AC/DC battery power source 460. In one non-limiting example. The second pole 498 can operate to define different electrical grounding (such as an earth ground 499 for the DC power bus 433), or neutral lines for the respective AC power buses 32, 34.

While non-limits aspects of the disclosure show and describe one or more controller modules 73, 79, aspects of the disclosure can be included wherein a single controller module 73, 79, or additional controller modules are included in the control schema described. For example, the controller module 73 can operably control aspects of the controller module 79, or can otherwise generate commands for the control module 79 to operate, or vice versa.

Figure 10:
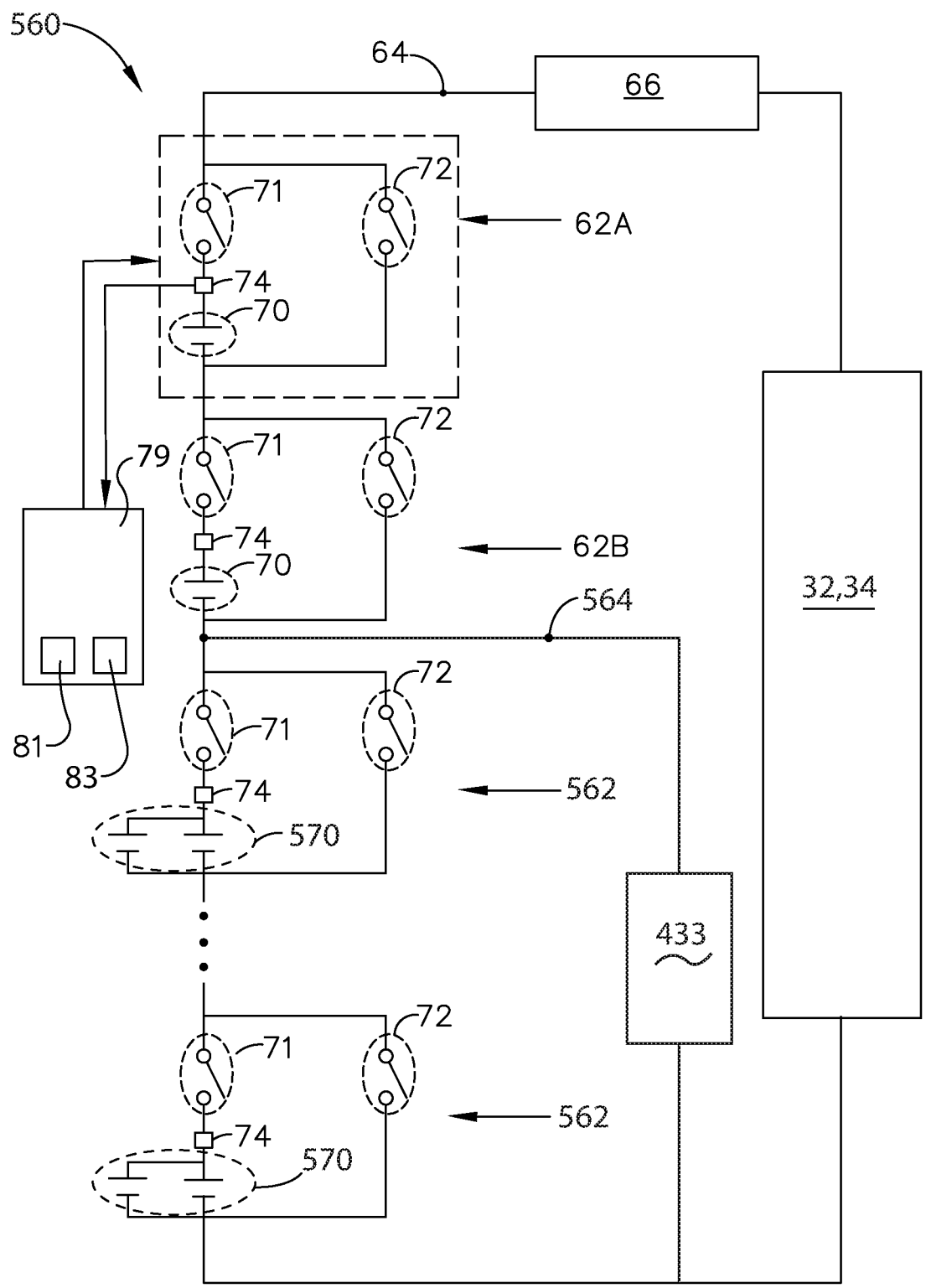
FIG. 10 is a schematic illustration of another battery power source that can be utilized in the power distribution system of FIG. 1, in accordance with various aspects described herein.

FIG. 10 illustrates another example of a battery power source 560. The battery power source 560 is similar to the battery power source 60; therefore, like parts will be identified with like numerals increased by 500, with it being understood that the description of the like parts of the battery power source 60 applies to the battery power source 560, unless otherwise noted. One difference is that the battery power source 560 can include parallel-arranged DC power storage devices 570 in a respective subset of the power storage units 562. As shown, the power storage units 562 can be arranged in series adjacent to each other. Another difference is that the battery power source 560 can include a second power output 564 that can, for example, provide a selectable or switchable voltage output to another power destination or electrical load, shown as the DC power bus 433. In this configuration, the battery power source 560 can selectably or operably provide dual power outputs, wherein the first power output 64 is supplying power from power storage units 62A, 62B, and 562, while the second power output 564 is supplying power from power storage units 562. The parallel-arranged DC power storage devices 570 of the power storage units 562 can be selected, arranged, numbered, or the like, such that the supplying of power from the power storage units 562 to both power outputs 64, 564, is sufficient (e.g. reliable power supply, redundant power supply, longer output duration of either power supply 64, 564 or when dual-supplying power, etc.).

Additionally, while not illustrated, aspects of the disclosure described and shown in FIG. 9, specifically the third switch 490 and the optional second pole 498 for the third switch can be incorporated into the aspects of FIG. 10. For example, either power output 64, 564 can include further switchable elements to selectively enable supplying power from the power output 64, 564 to any number of power outputs (shown as 492, 494, 496 in FIG. 9, for example). Example selectable power outputs 64, 564 utilizing the third switch 490 or adaptations thereof can include any permutation or combination of AC or DC buses 32, 34, 433, at one of or both power outputs 64, 564.

Many other possible aspects and configurations in addition to that shown in the above figures are contemplated by the present disclosure. For instance, aspects of the disclosure can apply to additional power transfer operations, including but not limited to, transferring power (e.g. on a power bus) between aircraft ground-based power supplies (e.g. a ground power cart or terminal power) to an auxiliary power unit, or to generator that has recently been started. Additionally, while aspects of the disclosure have been described as allowing or enabling power transfer capabilities between variable frequency generators, the disclosure can be utilized to allow or enable matching, harmonizing, or otherwise no-break power transfer capabilities between one or more variable frequency generators, one or more constant frequency generators, emergency power sources (e.g. ram air turbines), the like, or a combination thereof.

The aspects disclosed herein provide a method and apparatus for selectably operating a set of AC or DC power outputs from a set of DC power sources, such as batteries. Additionally, the aspects provide for a method and apparatus for no-break power transfer between multiple power sources by utilizing a controllable battery power source.

The technical effect is that the above described aspects enable the powering of a set of AC or DC power buses by utilizing DC power sources. Additionally, the aspects enable the no-break power transfer between a first power source having first power supply characteristics and a second power source having second power supply characteristics, wherein the first and second power supply characteristics are dissimilar, by utilizing a controllable power output from the battery power source to bridge the first and second power supply characteristics over a number of cycles.

One advantage that can be realized in the above aspects is that the above described aspects allow or enable the use of dissimilar generators or power sources to operably supply power to electrical loads. In this sense, the electrical loads are not interrupted while adjusting or switching power sources, allowing seamless transmission of electrical power while changing power sources. Another advantage that can be realized in the above aspects is that the disclosure enables a battery power source, such as a bank of batteries or the like, to provide a sufficient supply of temporary power to fully support the electrical requirements of the power distribution system, without requiring additional sources. In this sense, the battery power source can provide for supplemental power, emergency power, or no-break transitional power, as needed or demanded by the power distribution system. Furthermore, by operating the battery power source as a transitional or bridge power source during operation of aspects of the disclosure, no power source being enabled or disabled requires any changes to the operation, operational characteristics, or control schema (e.g. the generator control unit) of the respective power source. Yet another advantage of the disclosure is that the battery power source can be retrofitted with power distribution systems without large modifications to enable the no-break power transfer To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

1. A power supply, comprising: a set of power storage units arranged in series, each power storage unit having a respective direct current (DC) dischargeable power storage device, a first selectable connection configured to enable a voltage output of the respective power storage device, and a second selectable connection configured to enable bypassing the voltage output of the respective power storage device; a controller module communicatively connected with the set of first selectable connections and the set of second selectable connections and configured to selectively enable at least a subset of the first selectable connections or a subset of the second selectable connections; and a voltage output for the set of power storage units configured to be switchably connected with a set of power outputs, wherein the set of power outputs have different electrical characteristics.

2. The power supply of any of the disclosed aspects wherein at least one of the set of power outputs is a DC power output.

3. The power supply of any of the disclosed aspects wherein at least one of the set of power outputs is an alternating current (AC) power output.

4. The power supply of any of the disclosed aspects wherein the controller module is configured to selectively enable at least a subset of the first selectable connections or a subset of the second selectable connections, and wherein the selectively enabling emulates an AC waveform at the power output.

5. The power supply of any of the disclosed aspects, wherein the set of power storage units includes a first set of power storage units arranged in series and connected with the voltage output, the first set of power storage units having a positive voltage DC dischargeable power storage device, and a second set of power storage units arranged in series and connected with the voltage output, the second set of power storage units having a negative voltage DC dischargeable power storage device.

6. The power supply of any of the disclosed aspects wherein the set of power outputs includes at least one DC power output and at least one AC power output.

7. The power supply of any of the disclosed aspects wherein the set of power outputs includes at least a first DC power output and a second DC power output, wherein the electrical characteristics of the first DC power output is different from the electrical characteristics of the second DC power output.

8. The power supply of any of the disclosed aspects wherein the set of power outputs includes at least a first AC power output and a second AC power output, wherein the electrical characteristics of the first AC power output is different from the electrical characteristics of the second AC power output.

9. The power supply of any of the disclosed aspects wherein at least one of the set of power outputs is an AC power output, and the electrical characteristics of the AC power output are variably by way of selectively enabling at least a subset of the first selectable connections or a subset of the second selectable connections.

10. The power supply of any of the disclosed aspects, further comprising a third selectable connection, communicatively connected with the controller module, and operable to switchably connect the voltage output with a selected one of the set of power outputs.

11. The power supply of any of the disclosed aspects wherein the set of power outlets include a set of power buses.

12. The power supply of any of the disclosed aspects wherein the set of power buses are a set of power buses for an aircraft power distribution system.

13. The power supply of any of the disclosed aspects, further comprising a second power output configured to supply a second voltage output from a subset of the power storage units.

14. The power supply of any of the disclosed aspects wherein the voltage output and the second voltage output can simultaneously supply power from the set of power storage units.

15. The power supply of any of the disclosed aspects wherein each power storage unit further includes a power sensor configured to sense a dischargeable power output of the respective power storage device.

16. The power supply of any of the disclosed aspects wherein the voltage output enables no break power transfer between power buses connectable at the set of power outputs.

17. The power supply of claim 1 wherein the set of power storage units includes at least one of a battery, a battery bank, a battery cell, a super capacitor, a fuel cell, a hydrogen cell, a solar cell, or a wind turbine.

18. A method of supplying power, the method comprising: selectively enabling, by a controller module, one of a voltage output connection or a bypass connection for each of a set of dischargeable direct current (DC) power storage units arranged in series such that the summated output of the set of power storage units is provided to a set of switchably connectable power outputs.

19. The method of any of the disclosed aspects, further comprising sensing, by a power sensor, a dischargeable power value for at least a subset of the dischargeable power storage units.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power supply for a set of power outputs having a first electrical characteristic and a second electrical characteristic, comprising:
    a set of power storage units arranged in series, each power storage unit having a respective direct current (DC) dischargeable power storage device, a first selectable connection configured to enable a voltage output of the respective power storage device, and a second selectable connection configured to enable bypassing the voltage output of the respective power storage device;
    a controller module communicatively connected with the set of first selectable connections and the set of second selectable connections and configured to selectively enable at least a subset of the first selectable connections or a subset of the second selectable connections, wherein the selective enabling enables the providing of the first electrical characteristic or the second electrical characteristic by way of the set of power storage units; and
    a common voltage output for the set of power storage units configured to be switchably connected with the set of power outputs, wherein the common voltage output provides at least one of the first electrical characteristic or the second electrical characteristic to the set of power outputs.

2. The power supply of claim 1 wherein at least one of the set of power outputs is an alternating current (AC) power output.

3. The power supply of claim 2 wherein the controller module is configured to selectively enable at least a subset of the first selectable connections or a subset of the second selectable connections, and wherein the selectively enabling emulates an AC waveform at the power output.

4. The power supply of claim 2, wherein the set of power storage units includes a first set of power storage units arranged in series and connected with the voltage output, the first set of power storage units having a positive voltage DC dischargeable power storage device, and a second set of power storage units arranged in series and connected with the voltage output, the second set of power storage units having a negative voltage DC dischargeable power storage device.

5. The power supply of claim 1 wherein the set of power outputs includes at least one DC power output and at least one AC power output.

6. The power supply of claim 1 wherein the set of power outputs includes at least a first DC power output and a second DC power output, wherein the electrical characteristics of the first DC power output is different from the electrical characteristics of the second DC power output.

7. The power supply of claim 1 wherein the set of power outputs includes at least a first AC power output and a second AC power output, wherein the electrical characteristics of the first AC power output is different from the electrical characteristics of the second AC power output.

8. The power supply of claim 1 wherein at least one of the set of power outputs is an AC power output, and the electrical characteristics of the AC power output are variable by way of selectively enabling at least a subset of the first selectable connections or a subset of the second selectable connections.

9. The power supply of claim 1, further comprising a third selectable connection, communicatively connected with the controller module, and operable to switchably connect the voltage output with a selected one of the set of power outputs.

10. The power supply of claim 1 wherein the set of power outlets include a set of power buses.

11. The power supply of claim 1, further comprising a second power output configured to supply a second voltage output from a subset of the power storage units.

12. The power supply of claim 11 wherein the voltage output and the second voltage output can simultaneously supply power from the set of power storage units.

13. The power supply of claim 1 wherein each power storage unit further includes a power sensor configured to sense a dischargeable power output of the respective power storage device.

14. The power supply of claim 1 wherein the voltage output enables no break power transfer between power buses connectable at the set of power outputs.

15. The power supply of claim 1 wherein the set of power storage units includes at least one of a battery, a battery bank, a battery cell, a super capacitor, a fuel cell, a hydrogen cell, a solar cell, or a wind turbine.

16. The power supply of claim 1, wherein at least one of the first electrical characteristic or the second electrical characteristic comprises one of a direct current (DC) voltage, an alternating current (AC) voltage, a current output range, a frequency output range, or a phase.

17. The power supply of claim 16, wherein the first electrical characteristic comprises a first AC voltage having a first phase, and the second electrical characteristic comprises a second AC voltage having a second phase different from the first phase.

18. A method of supplying power to a set of switchably connectable power outputs having a first electrical characteristic and a second electrical characteristic, the method comprising:
selectively enabling, by a controller module, one of a voltage output connection or a bypass connection for each of a set of dischargeable direct current (DC) power storage units arranged in series such that the selective enabling enables the providing of the first electrical characteristic or the second electrical characteristic by way of the set of power storage units to the set of power outputs; and
providing a summated output of the set of power storage units by way of a common voltage output of the set of power storage units to the set of switchably connectable power outputs, wherein the common voltage output provides at least one of the first electrical characteristic or the second electrical characteristic.

19. The method of claim 18, further comprising sensing, by a power sensor, a dischargeable power value for at least a subset of the set of dischargeable DC power storage units.

20. A power supply for a set of power outputs having a first electrical characteristic and a second electrical characteristic, comprising:
a set of power storage units arranged in series, each power storage unit having a respective direct current (DC) dischargeable power storage device, a first selectable connection configured to enable a voltage output of the respective power storage device, and a second selectable connection configured to enable bypassing the voltage output of the respective power storage device;
a controller module communicatively connected with the set of power storage units and configured to selectively enable at least a subset of the first selectable connections or a subset of the second selectable connections thereby forming at least one of an alternating current (AC) voltage waveform or a direct current (DC) voltage waveform by way of the set of power storage units; and
a common voltage output for the set of power storage units configured to be switchably connected with the set of power outputs, wherein the common voltage output provides the at least one of the AC voltage waveform or the DC voltage waveform.

* * * * *